United States Patent Office 2,907,740
Patented Oct. 6, 1959

2,907,740

POLYEPOXIDE DIPHENOLIC ACID AMIDE COMPOSITIONS AND SAID COMPOSITIONS MODIFIED WITH ALDEHYDE CONDENSATES

Sylvan O. Greenlee, West Lafayette, Ind., assignor to S. C. Johnson & Son, Inc., Racine, Wis.

No Drawing. Application October 14, 1958
Serial No. 767,097

8 Claims. (Cl. 260—43)

This invention relates to new compositions resulting from the reaction of polyepoxides and Diphenolic Acid amides and/or said compositions modified with aldehyde condensates in regulated proportions to give valuable materials useful in the manufacture of moldings, adhesives, films, etc. The epoxides used in making the new compositions contain an average of more than one epoxide group per molecule and are free from functional groups other than epoxide, carboxyl, and hydroxyl groups. The Diphenolic Acid amides are prepared from monoamines or ammonia and suitable Diphenolic Acid. They have an aliphatic-aromatic structure and contain phenolic hydroxyl groups. The aldehyde condensate modifiers are fusible materials having free reactive sites. The invention includes the initial reaction mixtures as well as the intermediate and final reaction products derived therefrom.

An object of this invention is the production of new compositions from epoxides and Diphenolic Acid amides and said compositions modified with aldehyde condensates to form resins, varnishes, molding compositions, adhesives, etc.

Another object of this invention is the production of intermediate reaction compositions from the initial reaction mixtures of epoxides and Diphenolic Acid amides and said compositions modified with aldehyde condensates, which are capable of further reaction on the application of heat to form insoluble, infusible products.

Another object of this invention is the production of new admixtures of the materials set-forth hereinabove which are stable at ordinary temperatures for relatively long periods of time, yet which may be polymerized into insoluble, infusible products with or without the addition of catalysts by the application of heat.

These and other objects and advantages will appear from the following description, with particular reference to specific examples which are to be considered as illustrative only.

In general the compositions of the instant invention are prepared by reacting an epoxide with a Diphenolic Acid amide and if desired modifying said compositions with an aldehyde condensate, usually in the presence of heat. The polyepoxides contemplated for use herein are compounds containing an average of more than one and up to about 20 epoxide groups per molecule. Epoxide groups for the purpose of this specification refer to groups wherein the epoxy oxygen bridges adjacent carbon atoms. Such compositions, free from functional groups other than epoxide, carboxyl and hydroxyl groups, are reactive with active hydrogen containing groups including the phenolic groups supplied by the contemplated amides of Diphenolic Acids. Typical epoxides which have been found to be operable are complex resinous polyepoxides, resinous polyepoxide polyesters, epoxidized natural oils and aliphatic polyepoxides.

The Diphenolic Acid amides contemplated for use herein are amides of 4,4-bis(hydroxyaryl) pentanoic acids and their equivalent. An exemplary amide is the butyl amide of 4,4-bis(4-hydroxyphenyl) pentanoic acid.

The aldehyde condensates are prepared from low molecular weight aldehydes and ammonia derivatives or phenols capable of being condensed with an aldehyde. It is necessary that the condensate remain soluble and fusible as well as contain reactive methanol groups or an active hydrogen atom attached to some other functional group. Having generally described and set forth the objects of the invention, a more detailed description of operable components and reaction conditions will be given.

OPERABLE DIPHENOLIC ACID AMIDES

The Diphenolic Acid amides employed in this invention are prepared by the reaction of monoamines or ammonia with Diphenolic Acid such as described in prior copending applications Serial Nos. 507,138 and 564,886, filed May 9, 1955, and February 13, 1956, respectively.

The Diphenolic Acid used in preparing the amides must have two hydroxyaryl groups attached to a single carbon atom. The preparation of such an aryloxy acid is most conveniently carried out by condensing a keto acid with the desired phenol. To the best of applicant's knowledge, any keto acid or ester is operable in which a keto group is connected to a carboxy or carboalkoxy radical through an alkylene radical of at least 2 carbon atoms; however, experience in the preparation of bisphenol and related compounds indicates that the carbonyl group of the keto acid should be positioned next to a terminal methyl group in order to obtain satisfactory yields. Further, while a broad class of acids is contemplated such as the keto substituted pentanoic, hexanoic and heptanoic acids, the pentanoic acid, levulinic acid, is preferred since it is readily available.

Prior copending applications, Serial Nos. 464,607 and 480,300, filed October 25, 1954, and February 18, 1955, respectively, disclose a number of illustrative compounds suitable for use as the Diphenolic Acid and methods of preparing the same. These materials which are referred to for convenience as Diphenolic Acid or by the trade name DPA, consist of the condensation products of levulinic acid or its equivalent and phenol, substituted phenols or mixtures thereof. It is to be understood that the phenolic nuclei of the Diphenolic Acid may be substituted with any group which will not interfere with the reactions contemplated herein. Such groups are the halo, nitro and alkyl groups of 1 to 5 carbon atoms. The chloro and bromo phenols are the preferred halogenated materials although it is possible under proper conditions to condense fluoro substituted phenols with a keto acid. Diphenolic Acid derived from substituted phenols such as the alkylated phenols is sometimes more desirable than the products obtained from unsubstituted phenols due to properties imparted by the substituted groups. For instance, the alkyl groups provide better flexibility, water resistance and solvent solubility in selected solvents. However, the unsubstituted product is usually more readily purified.

Acids A to D inclusive, illustrate typical Diphenolic Acid. Proportions expressed are parts by weight unless otherwise indicated. Acid values as used herein represent the number of milligrams of KOH required to neutralize a one gram sample.

A

A mixture consisting of 376 parts of phenol, 116 parts of levulinic acid, and 250 parts of 37% aqueous hydrochloric acid was agitated at 48–52° C. for 66 hours. The top layer was removed from the aqueous hydrochloric acid layer by decantation. The product was then purified by vacuum distillation of the volatile unreacted materials by heating to 180° C. at 32 mm. pressure. The residual product amounted to 247 parts (86.5% theoretical) and had a softening point of 80° C. and an acid value of 155. Purification of this product by dissolving in an aqueous bicarbonate solution, reprecipitating with mineral acid, followed by recrystallization from hot water gave a white crystalline compound melting at 171–172° C. with an acid value of 196.

Softening points as used herein were run by Durrans' Mercury Method (Journal of Oil and Colour Chemists' Association, 12, 173–5 [1929]).

B 240.5 grams (2.18 mols) ortho cresol, 156 grams (37%) HCl, and 145 grams levulinic acid were charged to a 2-liter round bottom flask equipped with thermometer, reflux condenser and mechanical agitator. The temperature was raised to 50° C. in approximately 1 hour and held in this range for an additional 72 hours. The recovered material was washed 6 times with boiling water before steam distilling. The resultant crude material had an acid value of 156, a saponification No. of 206 and was recovered at 74% of theoretical based on levulinic acid.

This crude material was refluxed with aqueous sodium hydroxide for approximately 1 hour and the material reacidified, washed and filtered. The material was recrystallized from hot benzene and dried in a vacuum oven. The resultant material had an acid value of 169, theoretical 178, saponification value of 175, theoretical 178 and a melting point of 149–150° C.

C 363 parts of the ethyl ester of 4,4-bis(4-hydroxyphenyl) pentanoic acid prepared as in "A" above and 344 parts of sulfonyl chloride were charged to a 3-necked flask equipped with thermometer, reflux condenser, and mechanical stirrer. The reaction immediately exothermed and was cooled with a water bath maintaining the temperature at approximately 25° C. for 1 hour. The reaction charge became thick and then solidified with a pronounced temperature rise. The reaction mixture had a yellow color. Excess sulfonyl chloride was removed under slight pressure. The obtained ester had a chlorine content of 21.38% corresponding to the addition of approximately 2 chlorine atoms (theoretical equals 18.5%). The chlorinated ester was saponified to obtain the corresponding acid.

D 172 parts DPA prepared as in "A" above and 450 parts glacial acetic acid were charged to a 3-necked flask equipped with a thermometer, reflux condenser and mechanical stirrer. The resultant solution was tan in color. 264 parts of benzene were added to the charge before cooling to 0° C. in an ice bath. At this temperature, drop-wise addition of 85.8 parts 70% nitric acid diluted with 66 parts of glacial acetic acid was begun. The complete addition required 3 hours and 45 minutes with the reaction temperature never exceeding 0° C. The reaction charge at the end of the addition was a clear dark reddish solution. The charge was allowed to stir at temperatures between 5 and 20° C. for approximately 12 hours. At the end of this time, a heavy orange precipitate had formed. The precipitate was filtered and washed 3 times with distilled water before it was vacuum dried. The resultant crude material recovered at 84.5% of theoretical, had an acid value of 488 (theoretical equals 447) and a melting point of 102–4° C. The crude material was recrystallized from a mixture of hot ethanol and water to give a fine yellow crystalline material having a melting point of 137.5–140° C., a nitrogen content of 7.20% (theoretical equals 7.44%) and an acid value of 445.

Ammonia and a large number of amines are suitable for use in preparing the amides of the Diphenolic Acid used in the instant invention. The monoamines can be aliphatic, aromatic, saturated or unsaturated, substituted with other functional groups or unsubstituted. It is only necessary that the amines used contain a primary or secondary amino group and that the substituted groups of substituted materials do not interfere with the reaction of the amino groups of the amine or the carboxyl group of the acid. The monoamines can be low molecular weight or high molecular weight compounds. Illustrative amines include the saturated amines such as methylamine, dimethylamine, ethylamine, diethylamine, propylamine, isopropylamine, di-n-propylamine, butylamine, amylamine, hexylamine, laurylamine, stearylamine; the unsaturated amines such as allylamine, diallylamine, octadecadienylamine; the aromatic amines, including mononuclear fused and nonfused polynuclear amines such as aniline, naphthylamine, 2-amino toluene, etc. and the resinous amines such as the monoamine prepared by replacing the carboxyl group of abietic acid with an amino group. It should be realized that the characteristics of the final reaction product of the amines and Diphenolic Acid are dependent to a large extent on the selection of the amine to be used. For instance, if a long chain amine is used the flexibility is greater than with a short chain amine or ammonia whereas the latter usually imparts increased hardness. Therefore, in choosing the proper amine to be reacted with the Diphenolic Acid the end use of the compositions must be considered.

As apparent from herein above a large number of amines are suitable for use in preparing the Diphenolic Acid amides. The monoamines as implied above can contain other functional groups such as hydroxyl groups or unsaturated portions so long as the groups do not interfere substantially with the preparation of the amides. For instance, they can contain halogens provided that the amidification is carried out in an acid medium so that appreciable reaction with the phenolic hydroxyl groups of the Diphenolic Acid is eliminated. Therefore, for the purposes of this specification and claims the Diphenolic Acid amide can be referred to as a monoamide of 4,4 bis (hydroxyaryl) pentanoic acid. It is to be understood that this is intended to cover additional acids clearly equivalent to the pentanoic acids in the preparation of the subject materials.

The amides used herein are prepared using conventional processes known in the art. These processes will vary somewhat depending upon the properties of the reactants and in the properties of the amides resulting therefrom. The amine can be reacted directly with the Diphenolic Acid or it may be reacted with the ester of the acid with amidification being brought about by the application of heat, using temperatures up to about 225 to 250° C. Where low boiling amines are employed, lower temperatures should be used or the reaction carried out in a closed vessel to eliminate volatilization of the amine. In the case of high boiling amines the reaction with the acids can be carried out so that water formed during the amidification is removed as it is formed either by azeotropic distillation with a hydrocarbon solvent or by passing a stream of inert gas through the amidification mixture during the heating. If an ester is employed, volatile alcohols liberated during reaction may also be removed by distillation as they are formed. High boiling or solid alcohols not conveniently removed by distillation can often be removed by washing. In general, it may be said that the amidification can be carried out by procedures known in the art using suitable modifications. This will become more apparent from the following examples.

Examples 1 to 16 inclusive, illustrate the preparation of a selected group of Diphenolic Acid amides. It is to be understood that the examples are illustrative only and are not meant to limit the herein disclosed invention. Further, it should be appreciated that in all instances it is not necessary to completely purify the amides. Minor amounts of impurities or unreacted reactants have not been found to substantially affect the final compositions obtained therefrom. Proportions as used in the following examples are parts by weight unless otherwise indicated. Acid values represent the number of milligrams of KOH required to neutralize a one gram sample and amine values represent the number of milligrams of HCl required to neutralize a one gram sample. The amine and acid values were determined by electrometric titrations. Softening points were determined by Durrans' Mercury Method (Journal of the Oil and Colour Chemists' Association, 12, 173-175 [1929]).

Example 1

A mixture of 1145 parts of 4,4 bis(4-hydroxyphenyl) pentanoic acid and 585 parts of octylamine was heated with continuous agitation for a period of 15 hours at 190-210° C. An additional 47 parts of octylamine was added and heating continued for another 12 hours at 190° C. Low molecular weight materials were then removed by distillation at 20 mm. pressure, heating the reaction mixture at 190° C. The product, amounting to 1329 parts, had a softening point of 65° C., an amine value of 2.2, and an acid value of 0.

Example 2

A mixture of 573 parts of 4,4 bis(4-hydroxyphenyl) pentanoic acid and 315 parts of decylamine was heated at 170° C. for a period of 32 hours. The pressure within the reaction flask was reduced to 60 mm. during the last 30 minutes of heating, in order to remove volatile unreacted amine. The product amounting to 750 parts, had an acid value of 1.1, an amine value of 1.0 and a softening point of 142° C.

Example 3

A mixture of 429 parts of 4,4 bis(4-hydroxyphenyl) pentanoic acid and 278 parts of dodecylamine was heated for a period of 21 hours at 190° C. An additional 20 parts of dodecylamine was then added, and the heating continued for 2 hours at 190° C. The pressure within the reaction flask was reduced to 60 mm. pressure during the last 30 minutes of heating, to remove volatile unreacted amine. The product, amounting to 680 parts, had an acid value of 31.1, an amine value of 1.8, and a softening point of 138° C.

Example 4

A mixture of 573 parts of 4,4 bis(4-hydroxyphenyl) pentanoic acid and 540 parts of octadecylamine was heated for a period of 25 hours at 150-170° C. An additional 37 parts of octadecylamine was then added, and heating continued at 150-170° C. for a period of 8 hours. The product, amounting to 1087 parts, had an acid value of 3.2, an amine value of 1.1, and a softening point of 142° C.

Example 5

In a pressure autoclave provided with a mechanical agitator and a thermometer was added a mixture of 1145 parts of 4,4 bis(4-hydroxyphenyl) pentanoic acid and 585 parts of n-butyl amine. The pressure autoclave was closed and with continuous agitation the mixture heated for 2 hours at 170-180° C. The reaction mixture was then cooled, a reduced pressure of 20 mm. was created within the autoclave, and the product was again heated at 173° C. at this pressure under conditions whereby the unreacted butylamine and water were removed by distillation. The product, amounting to 1090 parts, had an acid value of 0, an amine value of 1.1, and a softening point of 175° C.

Example 6

In a pressure autoclave provided with a mechanical agitator and a thermometer was placed a mixture of 573 parts of 4,4 bis(4-hydroxyphenyl) pentanoic acid and 323 parts of di-n-butylamine. The autoclave was closed, and the reaction mixture heated with continuous agitation for 13 hours at 150-170° C. The volatile unreacted di-n-butylamine was then removed by distillation, heating the reaction mixture at 170° C. at a pressure of 20 mm. The product, amounting to 655 parts, had an acid value of 0 and a softening point of 70° C.

Example 7

To 100 parts of the methyl ester of 4,4 bis(4-hydroxyphenyl) pentanoic acid (M.P. 130-132° C.) in a pressure autoclave was added 80 parts of anhydrous ammonia. The pressure autoclave was closed and with continuous agitation the temperature was raised to 100° C. and held at this temperature for 4 hours. Unreacted anhydrous ammonia was then removed, and the solid product remaining was then pulverized and washed with 200 parts of diethylether to removed traces of unreacted methyl ester, to yield 85 parts of the pentanamide which is insoluble in the ether. This product was purified by dissolving it in methanol and reprecipitating it by the addition of water. The purified amide had a melting point of 185.5 to 187.5° C., a nitrogen content of 4.88% by weight (theoretical content is 4.90%), and a phenolic hydroxyl equivalent weight of 139.6 (theoretical value is 142.5). The hydroxyl equivalent weight represents the weight of material per hydroxyl group, and is determined by measuring the amount of acetic anhydride necessary to acetylate the amide.

Example 8

A mixture of 286 parts of 4,4 bis(4-hydroxyphenyl) pentanoic acid and 97 parts of diallyl amine was heated with continuous agitation for 4 hours at 148-158° C. The temperature was then gradually raised to 195° C. over a period of 37 minutes, then to a temperature of 235° C. over a period of 80 minutes, where the reaction mixture was held for 10 additional minutes, with the removal of water and volatile material from the reaction mixture. The product, amounting to 351 parts, had a softening point of 111° C., an amine value of 9.1, and an acid value of 31.7.

Example 9

A mixture of 286 parts of 4,4 bis(4-hydroxyphenyl) pentanoic acid and 57 parts of allyl amine was heated for 3¾ hours at 120-140° C. The temperature was then gradually raised to 207° C. over a period of 50 minutes. An additional 57 parts of allyl amine was then added and the resulting mixture held for 2 hours at 105-108° C. Subsequently the temperature of the mixture was gradually raised to 230° C. over a period of 35 minutes, collecting volatile material in the water trap. The product, amounting to 321 parts, had a softening point of 98° C., an amine value of 3.2, and an acid value of 31.1.

Example 10

A mixture was prepared of 286 parts of 4,4 bis(4-hydroxyphenyl) pentanoic acid and 317 parts of Rosin Amine D. Rosin Amine D, a derivative of specially treated rosins, is a technical grade of dehydroabietylamine marketed by Hercules Powder Company. (Properties of this amine are set forth in a publication entitled "Rosin Amine D and Its Derivative," 1953 edition, copyrighted 1952 by Hercules Powder Company.) This mixture was heated with agitation at 175° C. for a period of 1 hour. The temperature was then raised to 220° C. over a period of 20 minutes, and subsequently to 250° C. over a period of 15 minutes, with the removal of water in the water trap. The product, amounting to 577 parts, had a softening point of 131° C., an amine value of 1.6, and an acid value of 10.7.

Example 11

In a 3-neck flask provided with a thermometer and a mechanical agitator was placed a mixture of 72 parts of 4,4 bis(4-hydroxyphenyl) pentanoic acid and 135 parts of Armeen 2S. Armeen 2S is a secondary amine marketed by Armour and Company, the alkyl chains of the amine being 20% hexadecyl, 20% octadecyl, 25% octadecenyl, 35% octadecadienyl. Properties of this amine and the tion entitled "Armeens, High Molecular Weight Aliphatic amine, and 37% octadecadienyl amine. With agitation, Amines," copyrighted 1954 by Armour Chemical Division, Armour and Company. With agitation, the reaction mixture was heated to 130° C., then raised to 158° C. over a period of 2½ hours, and finally raised to 203° C. over a period of 3½ hours, removing water by volatilization during the reaction period. The product, amounting to 198 parts, was a viscous liquid having an amine value of 14.2, and an acid value of 0.9.

Example 12

In a 3-neck flask provided with a thermometer and a mechanical agitator was placed a mixture of 286 parts of 4,4 bis(4-hydroxyphenyl) pentanoic acid and 274 parts of Armeen SD. This unsaturated monoamine composition is a distilled grade, primary amine marketed by Armour and Company, and contains about 20% hexadecyl amine, 17% octadecyl amine, 26% octadecenyl amine, and 37% octadecadienyl amiine. With agitation, the reaction mixture was heated to 155° C., then raised to 190° C. over a period of 1 hour, and finally heated to 224° C. over a period of 18 minutes, removing water by volatilization during the reaction period. The product, amounting to 536 parts, had a softening point of 118° C., an amine value of 6 and an acid value of 16.

Example 13

A mixture of 573 parts of 4,4 bis(4-hydroxyphenyl) pentanoic acid and 205 parts of aniline was heated with agitation for 12 hours at 180° C. The temperature was then gradually increased to 190° C. over a 1 hour period. Subsequently the water trap was filled with cyclohexane, and the reaction mixture refluxed for 2 hours at a temperature of 170–180° C. with the removal of traces of water from the reaction mixture. Final stripping of the mixture was done at a temperature of 180° C. and at a pressure of 60 mm. for 1 hour, resulting in the isolation of 701 parts of the anilide of 4,4 bis(4-hydroxyphenyl) pentanoic acid having a softening point of 107° C., an amine value of 0, and an acid value of 7.75.

Example 14

A mixture of 314 parts of the ortho cresol DPA made as in "B" above and 185 parts of Armeen 12 (a mixture of primary amines composed of 2 parts decyl, 3 parts tetradecyl and 95 parts dodecyl amine, marketed by the Armour Chemical Division, 1355 West 31st Street, Chicago 9, Illinois) was charged to a 3-neck, round bottom flask fitted with a thermometer, mechanical agitator, reflux condenser and water trap. The temperature was raised to 203° C. over a period of approximately one hour and held at this temperature for approximately 14 hours at which time a low vacuum was applied to the reaction flask in order to draw off any volatile materials. The resultant product had an acid value of 2 and an amine value of 2.6.

Example 15

A mixture of 178 parts of chloro DPA, made as in "C" above and 100 parts Armeen C (a mixture of primary amines composed of 8 parts octyl, 9 parts decyl, 47 parts dodecyl, 18 parts tetradecyl, 8 parts hexadecyl, 5 parts octadecyl and 5 parts octadecenyl amine, marketed by the Armour Chemical Division, 1355 West 31st Street, Chicago 9, Illinois) was charged to a round bottom, 3 neck flask fitted with mechanical agitator, thermometer, reflux condenser and water trap. The temperature was raised to 201° C. over a period of approximately one hour and thirty minutes and held at this temperature for approximately 14 hours at which time a vacuum line was attached to the reaction flask to draw off any volatile materials. The resultant product was a solid having an acid value of 0 and an amine value of 3.

Example 16

A mixture of 188 parts of the nitro DPA (D above) and 131 parts of Armeen T (a mixture of primary amines composed of 2 parts tetradecyl, 24 parts hexadecyl, 28 parts octadecyl and 46 parts octadecenyl amine, marketed by the Armour Chemical Division, 1355 West 31st Street, Chicago 9, Illinois) was charged to a 3 neck flask equipped with agitator, thermometer, reflux condenser and water trap. The temperature was raised to 150° C. over a period of 2 hours and held at this temperature for approximately 13 hours at which time a vacuum line was attached to the reaction flask to draw off any volatile materials. The resultant product was a black solid having an acid value of 17 and an amine value of 2.

In Examples 1 to 16 inclusive, other Diphenolic Acid can be used including those substituted with chloro, bromo, nitro and alkyl groups of 1 to 5 carbon atoms exemplified by 4,4 bis(4-hydroxy-3-ethyl phenyl) pentanoic acid, 4,4 bis(4-hydroxy-3,5-isopropyl phenyl) pentanoic acid, 4,4 bis(4-hydroxy-2-ethyl phenyl) pentanoic acid, 4,4 bis(2-hydroxy-4-butyl phenyl) pentanoic acid, 4,4 bis(4-hydroxy-2,5-diamyl phenyl) pentanoic acid, 4,4 bis(4-hydroxy-3-nitro phenyl) pentanoic acid, 4,4 bis(2-hydroxy-3-nitro-phenyl) pentanoic acid, 4,4 bis(4-hydroxy-3-methyl phenyl) pentanoic acid, 4,4 bis(4-hydroxy-3-amyl phenyl) pentanoic acid, 4,4 bis(4-hydroxy-3-chloro phenyl) pentanoic acid, 4-(4-hydroxyphenyl)-4-(4-hydroxy-3-amyl phenyl) pentanoic acid, 4-(4-hydroxy-phenyl) - 4 - (2 - hydroxy - 4 - chloro phenyl) pentanoic acid, 4-(4-hydroxyphenyl)-4-(4-hydroxy-3,5-dibromo phenyl) pentanoic acid, 4,(4-hydroxyphenyl)-4-(2-hydroxy-4-nitro phenyl) pentanoic acid, 4-(4-hydroxyphenyl) - 4 - (4 - hydroxy - 3 - sulfo phenyl) pentanoic acid, 4 - (4 - hydroxyphenyl) - 4 - (2 - hydroxy - 3,5 - dimethyl phenyl) pentanoic acid, 4,4 bis(2-hydroxy-4-butyl phenyl) pentanoic acid, 4,4 bis(2-hydroxy-5 methyl 3 chloro phenyl) pentanoic acid, 4,4 bis(4-hydroxy-3,5-dibromo phenyl) pentanoic acid, 4,4 bis(4-hydroxy-3,5-dinitro phenyl) pentanoic acid, 4,4 bis (2-hydroxy-3 nitro-5 methyl phenyl) pentanoic acid, 4,4 bis(4-hydroxy-3-methyl-5 chloro phenyl) pentanoic acid, 5,5 bis(4-hydroxy phenyl) hexanoic acid, 5,5 bis(4-hydroxy-3-methyl phenyl) hexanoic acid, 5,5 bis(4-hydroxy-3-nitro phenyl) hexanoic acid, and 5,5 bis(4-hydroxy-3-chloro phenyl) hexanoic acid.

In Examples 1 to 16 inclusive, other monoamines can be used including propylamine, isopropylamine, isoamylamine, amylamine, oleylamine, heptylamine, cyclohexylamine, naphthylamine, 2-amino toluene, 2,4-diethylaniline, 2,2 bis(4-amino phenyl) propane and 2,2 bis(4-amino-3-chloro phenyl) propane.

OPERABLE EPOXIDES

Illustrative of the epoxide compositions which may be employed in this invention are the complex epoxide resins which are polyether derivatives of polyhydric phenols with such polyfunctional coupling agents as polyhalohydrins, polyepoxides, or epihalohydrins. These compositions may be described as polymeric polyhydric alcohols having alternating aliphatic chains and aryl nuclei connected to each other by ether linkages, containing terminal epoxide groups and free from functional groups other than epoxide and hydroxyl groups. It should be understood that significant amounts of the monomeric reaction products are often present. This would be illustrated by I to III below where n equals zero. Preparation of these epoxide materials as well as illustrative examples are described in U.S. Patents 2,456,408, 2,503,726, 2,615,-007, 2,615,008, 2,668,807, 2,688,805 and 2,698,315. Well-known commercial examples of these resin are the Epon resins marketed by the Shell Chemical Corporation. Illustrative of the preparation of these epoxide resins are the following reactions wherein the difunctional coupling agent is used in varying molar excessive amounts:

Polyhydric phenol and an epihalohydrin bis(hydroxyphenyl)isopropylidene + excess epichlorohydrin

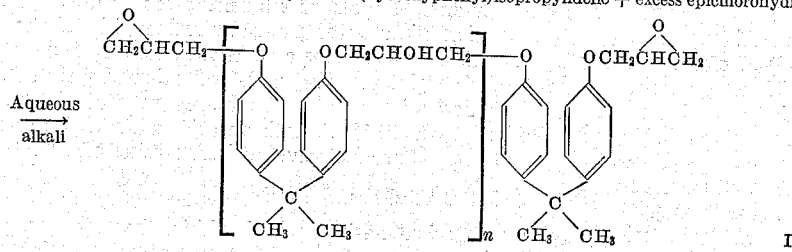

Polyhydric phenol and a polyepoxide bis(hydroxyphenyl)isopropylidene + excess butylene dioxide

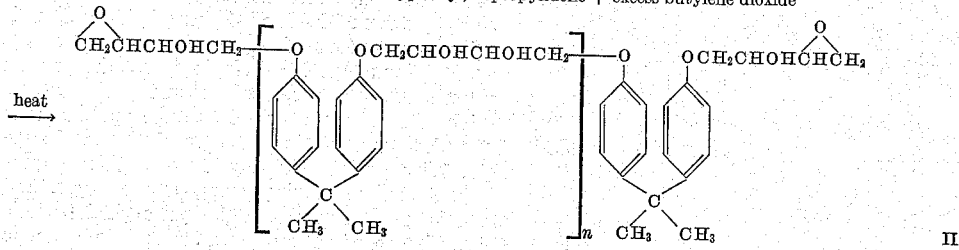

Polyhydric phenol and a polyhalohydrin bis(hydroxyphenyl)isopropylidene + excess alpha-glycerol dichlorohydrin

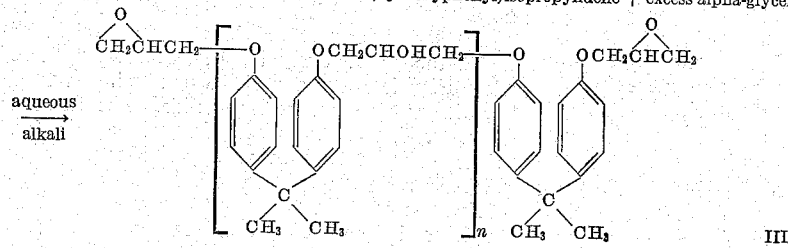

As used in the above formulas, $n$ indicates the degree of polymerization depending on the molar ratio of reactants. As can be seen from these formulas, the complex epoxide resins used in this invention contain terminal epoxide groups and alcoholic hydroxyl groups attached to the aliphatic portions of the resin, the latter being formed by splitting the epoxide groups in the reaction of the same with phenolic hydroxyl groups. Ultimately, the reaction with the phenolic hydroxyl groups of the polyhydric phenols is generally accomplished by means of epoxide groups formed from halohydrins by the loss of hydrogen and halogen as shown by the following equation:

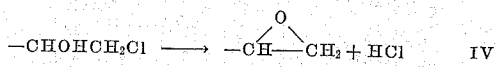

Other epoxide compositions which may be used include the polyepoxide polyesters which may be prepared by esterifying tetrahydrophthalic anhydride with a glycol and epoxidizing the product of the esterification reaction. In the preparation of the polyester, tetrahydrophthalic acid may also be used as well as the simple esters of tetrahydrophthalic acid such as dimethyl and diethyl esters. There is a tendency with tertiary glycols for dehydration to occur under the conditions used for esterification so that generally the primary and secondary glycols are the most satisfactory in the polyester formation. Glycols which may be used in the preparation of this polyester composition comprise, in general, those glycols having 2 hydroxyl groups attached to separate carbon atoms and free from functional groups which would interfere with the esterification or epoxidation reactions. These glycols include such glycols as ethylene glycol, diethylene glycol, triethylene glycol, tetramethylene glycol, propylene glycol, polyethylene glycol, neopentyl glycol, and hexamethylene glycol. Polyepoxide polyesters may be prepared from these polyesters by epoxidizing the unsaturated portions of the tetrahydrophthalic acid residues in the polyester composition. By properly proportioning reactants in the polyester formation and regulating the epoxidation reaction, polyepoxides having up to 12 or more epoxide groups per molecule may be readily prepared. These polyepoxide polyester compositions as well as their preparation are more fully described in a copending application having Serial No. 503,323, filed April 22, 1955.

Polyepoxide compositions useful in this invention also include the epoxidized unsaturated natural oil acid esters, including the unsaturated vegetable, animal and fish oil acid esters made by reacting these materials with various oxidizing agents. These unsaturated oil acid esters are long chain aliphatic acid esters containing from about 15 to 22 carbon atoms. These acids may be esterified by simple monohydric alcohols such as methyl, ethyl or decyl alcohol, by polyhydric alcohols such as glycerol, pentaerythritol, polyallyl alcohol, or resinous polyhydric alcohols. Also suitable are the mixed esters of polycarboxylic acids and long chain unsaturated natural oil acids with polyhydric alcohols, such as glycerol and pentaerythritol. These epoxidized oil acid esters may contain more than 1 up to 20 epoxide groups per molecule. The method of epoxidizing these unsaturated oil acid esters consists of treating them with various oxidizing agents, such as the organic peroxides and the peroxy acids, or with one of the various forms of hydrogen peroxide. A typical procedure practiced in the art consists of using hydrogen peroxide in the presence of an organic acid, such as acetic acid and a catalytic material, such as sulfuric acid. More recently epoxidation methods have consisted of replacing the mineral acid catalyst with a sulfonated cation exchange material, such as the sulfonated copolymer of styrene divinylbenzene.

The epoxide compositions which may be used in preparing the compositions of this invention also include aliphatic polyepoxides which may be illustrated by the products obtained by polymerizing allyl glycidyl ether through its unsaturated portion. In the polymerization of these ethers there is probably some polymerization occurring through the epoxide groups, and in addition some splitting of the epoxide groups to form hydroxyl groups so that pure compounds are not usually obtained.

Other aliphatic polyepoxides useful in this invention may be illustrated by the poly(epoxyalkyl) ethers derived from polyhydric alcohols. These materials may, in general, be prepared by reacting an aliphatic polyhydric alcohol with an epihalohydrin in the presence of a suitable catalyst and in turn dehydrohalogenating the product to produce the epoxide composition. The production of these epoxides may be illustrated by the reaction of glycerol with epichlorohydrin in the presence of boron trifluoride followed by dehydrohalogenation with sodium aluminate as follows:

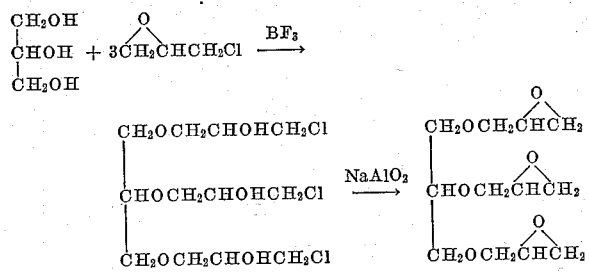

It is to be understood that such reactions do not give pure compounds and that the halohydrins formed and the epoxides derived therefrom are of somewhat varied character depending upon the particular reactants, their proportions, reaction time and temperature. In addition to epoxide groups, the epoxide compositions may be characterized by the presence of hydroxyl groups and halogens. Dehydrohalogenation affects only those hydroxyl groups and halogens which are attached to adjacent carbon atoms. Some halogens may not be removed in this step in the event that the proximate carbinol group has been destroyed by reaction with an epoxide group. These halogens are relatively unreactive and are not to be considered as functional groups in the conversion of the reaction mixture of this invention. The preparation of a large number of these mixed polyepoxides is described in the Zech patents, U.S. 2,538,072, 2,581,464 and 2,712,000. Still other polyepoxides which have been found to be valuable are such epoxide compositions as diepoxy butane, diglycid ether epoxidized polybutadiene and bis(glycidyloxy)butene.

Immediately following will be a description or illustration of preparations of polyepoxides which will be used in examples of compositions of this invention.

The complex resinous polyepoxides used in the examples and illustrative of the commercially prepared products of this type are the Epon resins marketed by Shell Chemical Corporation. The following table gives the properties of some Epon resins which are prepared by the condensation in the presence of alkali of bis(4-hydroxyphenyl) isopropylidene with a molar excess of epichlorohydrin in varying amounts.

| Epon resin type | Melting point, °C. | Viscosity [1] (Gardner-Holdt) | Epoxide equivalent | Average molecular weight |
| --- | --- | --- | --- | --- |
| Epon 864 | 40–45 | $A_1$–B | 325 | 450 |
| Epon 1001 | 64–76 | C–G | 480 | 640 |
| Epon 1004 | 95–105 | Q–U | 870 | 1,133 |
| Epon 1007 | 127–133 | Y–$Z_1$ | 1,750 | |
| Epon 1009 | 145–155 | $Z_2$–$Z_3$ | 3,200 | |

[1] Based on 40% non-volatile in butyl Carbitol at 25° C.

Examples 17 through 19 describe the preparation of typical polyepoxide polyesters.

*Example 17*

In a 3-necked flask provided with a thermometer, mechanical agitator and a reflux condenser attached through a water trap was placed a mixture of 3 mols of tetrahydrophthalic anhydride and 2 mols of n-butanol. After melting the tetrahydrophthalic anhydride in the presence of the butanol, 2 mols of ethylene glycol were added. The reaction mixture was gradually heated with agitation to 225° C. at which point a sufficient amount of xylene was added to give refluxing at esterification temperature. The reaction mixture was then heated with continuous agitation at 225–235° C. until an acid value of 4.2 was obtained. This product gave an iodine value of 128.

EPOXIDATION OF THE POLYESTER RESIN

In a 3-necked flask provided with a thermometer, a mechanical agitator, and a reflux condenser was placed 107 parts of the dehydrated acid form of a cation exchange resin (Dowex 50 X–8, 50–100 mesh, Dow Chemical Company, a sulfonated styrenedivinylbenzene copolymer containing about 8% divinylbenzene, the percent divinylbenzene serving to control the amount of crosslinkage. The Dowex resins are discussed in publications entitled "Ion Exchange Resins No. 1" and "Ion Exchange Resins No. 2," copyright 1954 by Dow Chemical Company, the publications having form number Sp32–254 and Sp31–354, respectively) and 30 parts glacial acetic acid. The mixture of cation exchange resin and acetic acid was allowed to stand until the resin had completely taken up the acid. To this mixture was added 200 parts of the polyester resin dissolved in an equal weight of xylene. To the continuously agitated reaction mixture was added dropwise over a period of 45 minutes to 1 hour, 75 parts of 50% hydrogen peroxide. The reaction temperature was held at 60° C. requiring the application of some external heat. (In some preparations involving other polyester resins, sufficient exothermic heat is produced during the addition of hydrogen peroxide so that no external heat is required, or even some external cooling may be required.) The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 42. The percent non-volatile of this solution amounting to 400 parts was 50. This 400 parts of solution was thoroughly mixed with 110 parts of the dehydrated basic form of Dowex 1 (an anion exchange resin of the quaternary ammonium type. Dowex 1 is a styrenedivinylbenzene copolymer illustrated by the formula $RR'_3N^+OH^-$ where R represents the styrenedivinylbenzene matrix and R' is a methyl group, manufactured by the Dow Chemical Company). The resulting mixture was then filtered followed by pressing as much of the solution as possible from the anion exchange resin cake. This product had an acid value of 4.5 and an epoxide equivalent of 288 based on a non-volatile resin content of 42.0%. The epoxide values as discussed herein were determined by refluxing for 30 minutes a 2-gram sample with 50 milliliters of pyridine hydrochloride in excess pyridine. (The pyridine hydrochloride solution was prepared by adding 20 milliliters of concentrated HCl to a liter of pyridine.) After cooling to room temperature, the sample is then back-titrated with standard alcoholic sodium hydroxide.

*Example 18*

Following the procedure of Example 17, a polyester resin was prepared from 5 mols of tetrahydrophthalic anhydride, 4 mols of diethylene glycol and 2 mols of n-butanol. This product had an acid value of 5.3 and an iodine value of 107. This polyester resin was epoxidized in the manner previously described to give an epoxide equivalent weight of 371 on the non-volatile content. The non-volatile content of this resin solution as prepared was 40.2%.

Example 19

The process of Example 17 was followed to obtain a polyester resin from 1.1 mols of tetrahydrophthalic anhydride, 1 mol of 1,4-butanediol and 0.2 mol of n-butanol. The product had an acid value of 8.6. This polyester resin was epoxidized in the same manner to give an epoxide equivalent weight of 292 and an acid value of 5.2 on the non-volatile content. The non-volatile content of this resin solution was 41.9%.

Examples 20 and 21 describe the preparation of aliphatic polyepoxides.

Example 20

In a reaction vessel provided with a mechanical stirrer and external cooling means was placed 276 parts of glycerol and 828 parts of epichlorohydrin. To this reaction mixture was added 1 part of 45% boron trifluoride ether solution diluted with 9 parts of ether. The reaction mixture was agitated continuously. The temperature rose to 50° C. over a period of 1 hour and 45 minutes at which time external cooling with ice water was applied. The temperature was held between 50 and 75° C. for 1 hour and 20 minutes. To 370 parts of this product in a reaction vessel provided with a mechanical agitator and a reflux condenser was added 900 parts of dioxane and 300 parts of powdered sodium aluminate. With continuous agitation this reaction mixture was gradually heated to 92° C. over a period of 1 hour and 50 minutes, and held at this temperature for 8 hours and 50 minutes. After cooling to room temperature, the inorganic material was removed by filtration. The dioxane and low boiling products were removed by heating the filtrate to 205° C. at 20 mm. pressure to give a pale yellow product. The epoxide equivalent of this product was determined by treating a 1-gram sample with an excess of pyridine containing pyridine hydrochloride (made by adding 20 cc. of concentrated hydrochloric acid per liter of pyridine) at the boiling point for 20 minutes and back-titrating the excess pyridine hydrochloride with 0.1 N sodium hydroxide using phenolphthalein as indicator and considering one HCl as equivalent to one epoxide group. The epoxide equivalent on this product was found to be 152.

Example 21

In a 3-necked flask provided with a thermometer, mechanical agitator, reflux condenser and dropping funnel was placed 402 parts of allyl glycidyl ether. With continuous agitation the temperature was raised to 160° C. at which time one part of a 60% solution of methyl ethyl ketone peroxide dissolved in diethyl phthalate was added. The temperature was held at 160–165° C. for a period of 8 hours, adding one part of the methyl ethyl ketone peroxide solution each 5 minutes during the 8-hour period. After the reaction mixture had stood overnight, the volatile ingredients were removed by vacuum distillation. The distillation was started at 19 mm. pressure and a pot temperature of 26° C. The volatile material was finally removed at a pressure of 3 mm. and a pot temperature of 50° C. The residual product had a molecular weight of 418, and an equivalent weight to epoxide content of 198. The yield amounted to 250 parts.

OPERABLE ALDEHYDE CONDENSATES

Two general classes of aldehyde condensates are contemplated for preparing the modified products of this invention, those prepared from ammonia derivatives and those derived from phenols, with the choice being dependent on the end uses and characteristics desired. For instance, if the end use were to be a white enamel, the ammonia derivative-aldehyde condensates would probably be chosen because of their extremely light initial color and their good color retention. The phenols are somewhat darker in color and have a tendency to yellow upon aging. For the most desirable non-polar solvent solubility, the phenol-aldehyde condensates would be the proper choice since the ammonia derivative-aldehyde condensates usually require some butanol and xylol present to give the desirable solubility. For certain applications, the butanol odor is objectionable and at times the butanol is incompatible with other resins which are used. Adhesion to metals also appears to be better in the phenolaldehyde condensates.

The aldehyde-ammonia derivative condensation products are formed by the reaction of aldehydes with amines or amides such as urea, thriourea, and their derivatives, melamines and sulfonamides. It is necessary that the ammonia derivative contain at least one >NH group. Thus nitriles and tertiary amines which are also considered ammonia derivatives are excluded. Otherwise the definition reads on amides and primary and secondary amines. It is well known that such materials including a number of their derivatives react with aldehydes to form aldehyde-amine or aldehyde-amide condensates. Exemplary derivatives are substituted urea, thiourea, or melamine such as the long-chain alkyl-substituted materials which impart oil or organic solvent solubility. Suitable sulfonamides include aromatic mononuclear sulfonamides such as toluene sulfonamide, polynuclear sulfonamides such as naphthalene sulfonamide, sulfonamides of aromatic polynuclear ethers and mono- or polyfunctional sulfonamides. In addition to melamine, other operable ammonia derivatives containing the azide bridge are the amino di- and triazines.

In the condensation of aldehydes with the organic ammonia derivatives, initially the reaction appears to be the addition of aldehyde to the organic ammonia derivative to form primarily intermedate alkylol compounds. These compounds will further condense to form more resinous materials, combining with each other through alkylene bridges formed between the nitrogen atoms of the compounds.

In the alkylol condensate and in the more condensed products of an advanced stage of condensation, there are hydrogen atoms present in the hydroxyl groups which have been formed in the production of the alkylol condensate and which have not been destroyed by further condensation. There are also an appreciable number of hydrogen atoms attached to nitrogen atoms of the amide or amine groups present in the condensation products. These hydrogens contained in the hydroxyl groups and the amide or amine groups are active with respect to epoxide groups and will react therewith in the reaction mixtures of this invention to form complex, crosslinked products.

In general, the condensation products of ammonia derivatives and aldehydes contemplated herein are the partial and intermediate reaction or condensation products of aldehydes, particularly formaldehyde, with amines or amides or mixtures thereof. The condensate can be in its monomeric form which is essentially an alkylol or polyalkylol product or it may be highly condensed. It is suitable as long as it is still fusible and is soluble in or compatible with the epoxide composition and the diphenolic acid amide composition with which it is to be reacted. The reactions which produce such condensation products involve the removal of amino or amido hydrogen atoms from the ammonia derivative. Therefore, it should be appreciated that an ammonia derivative as stated hereinbefore, in order to be suitable for condensation with an aldehyde, must contain at least one hydrogen atom attached to the nitrogen atom. Thus, the condensates may be made by various processes known in the art for the manufacture of aldehyde-ammonia derivative resins, resulting in water-soluble, alcohol-soluble or oil-soluble types.

Many of the commercial products derived from the reaction of urea, thiourea, or melamine with formaldehyde are mixed products made by reaction the formaldehyde with mixtures of these materials. Such composite or mixed reaction products can advantageously be used for reaction with the epoxides and the Diphenolic Acid amides according to the present invention. In addition, many of the present day commercial resins derived from aldehydes and urea, thiourea or melamine, or a mixture thereof, are prepared in the presence of alcoholic or other solvents which take part in the reaction and become an integral part of the resulting resin composition. This is illustrated by the products prepared in the presence of butyl alcohol in which case the butyl alcohol to some extent condenses with the alkylol groups of the aldehyde condensate to give butyl ether residues as a part of the final composition. Such modified products are also suitable. In some cases it may be desirable to use an ammonia derivative-aldehyde condensate which is completely soluble in a common solvent or a mixture of solvents used to dissolve the epoxide and the Diphenolic Acid amide. Solutions prepared in this manner can be applied as a coating and the solvent subsequently evaporated before the main reaction involving the epoxide, Diphenolic Acid amide and condensate takes place.

Examples 22 to 26 inclusive, describe the preparation of typical ammonia derivative-aldehyde condensates suitable for use herein.

*Example 22*

In a 3-liter 3-neck flask provided with a mechanical agitator, a thermometer, and reflux condenser was placed 120 parts of urea, 600 parts of 37% aqueous formaldehyde and 1040 parts of n-butyl alcohol. With continuous agitation the reaction mixture was heated to reflux temperature and the refluxing continued for a period of 1 hour. At this point a water trap was placed between the reflux condenser and flask and filled with toluene. Distillation was continued until 315 parts of water were removed from the reaction mixture. The resulting mixture was cooled to room temperature, filtered, and 1030 parts of a clear, water-white syrupy liquid isolated.

*Example 23*

The procedure of preparation including the water removal was the same as that used in Example 22. A mixture of 304 parts of thiourea, 960 parts of 37% aqueous formaldehyde, and 800 parts of n-butyl alcohol was used to give a final yield of 1214 parts of a clear, light amber, syrupy product.

*Example 24*

The procedure of preparation including the removal of water was the same as that used in Example 22. A mixture of 120 parts of urea, 148 parts of thiourea, 950 parts of 37% aqueous formaldehyde and 800 parts of n-butyl alcohol was used to give a final yield of 1175 parts of a clear, almost colorless, syrupy liquid.

*Example 25*

In a 3-liter 3-neck flask provided with a mechanical agitator, a thermometer and a reflux condenser was placed 378 parts of melamine, 840 parts of 37% aqueous formaldehyde, and 725 parts of n-butyl alcohol. With continuous agitation the reaction mixture was heated to reflux temperature and the refluxing continued for a period of 30 minutes. At this point a water trap was placed in the distilling column between the flask and the reflux condenser and filled with toluene. The refluxing was continued until a total of 590 parts of water had been removed from the reaction mixture. The product amounting to 1342 parts was a clear, water-white, heavy, syrupy liquid.

*Example 26*

In a 3-liter 3-neck flask provided with a mechanical agitator, a thermometer and a reflux condenser was placed 1370 parts of p-toluenesulfonamide and 640 parts of 37% aqueous formaldehyde the pH of which had been previously adjusted to 6.0 with potassium acid phthalate and sodium hydroxide. With continuous agitation the reaction mixture was heated to reflux temperature over a period of 40 minutes and the refluxing continued for a period of 15 minutes. At this point the reaction mixture was allowed to cool and the water decanted from the resin. The resin was washed 3 times with warm water and finally dehydrated in vacuum at 30–50 mm. pressure, using a maximum flask temperature of 90° C. to yield 1245 parts of water-white resinous solid.

In Examples 22 to 26 inclusive, the ammonia derivative can be replaced by other materials which have a >NH group with the free valences being filled by hydrogen or carbon atoms. This therefore includes amides and primary and secondary amines such as the ureas, thioureas, melamines, sulfonamides, and alkyl-substituted derivatives thereof. It is only necessary that the material be capable of condensing with an aldehyde.

The second class of condensates suitable for modifying the compositions herein described are those which contain reactive phenolic hydroxyl groups formed by the reaction of phenols and aldehydes. Phenol and formaldehyde react to form a variety of reaction products depending upon the proportions and conditions of reaction. These include products such as phenol alcohols having both phenolic and alcoholic hydroxyl groups, and products of the diphenolmethane type containing phenolic hydroxyl groups only. The condensation of phenol and formaldehyde can be carried out with the use of acid or alkaline condensing agents and in some cases by first combining the aldehyde with an alkali such as ammonia to form hexamethylenetetramine and reacting the latter with the phenol. The phenol-aldehyde resins at an initial or intermediate stage of reaction are intended to be included in the term phenol-aldehyde condensates as used herein.

In general, the phenol-aldehyde condensates should not have their condensation carried so far as to become insoluble and nonreactive. It is preferred in the preparation of the instant compositions that they be used at an intermediate stage or at a stage of reaction such that they contain reactive phenolic hydroxyl groups or both phenolic and alcoholic hydroxyl groups. This is desirable in order to permit a proper blending of the phenol-aldehyde condensate with the polyepoxides and Diphenolic Acid amide for subsequent reaction therewith.

The phenol-aldehyde condensates may be derived from mononuclear phenols, polynuclear phenols, monohydric phenols or polyhydric phenols. The critical requirement for the condensate is that it be compatible with the polyepoxides and diphenolic acid amides or with the two reactants in a solvent used as a reaction medium. The phenol-aldehyde condensate which is essentially a polymethylol phenol rather than a polymer may be used in the preparation of the new phenol-aldehyde, polyepoxide, diphenolic acid amide products, or it may be used after further condensation, in which case some of the methylol groups are usually considered to have disappeared in the process of condensation. Various so-called phenolic resins which result from the reaction of phenols and aldehydes, and particularly from common phenols or cresols and formaldehyde, are available as commercial products both of an initial and intermediate character. Such products include resins which are readily soluble in common solvents or readily fusible so that they can be admixed with the epoxides and diphenolic acid amides and reacted therewith to form the products of this invention.

In selecting a phenol-aldehyde condensate one may choose either the heat-converting or the permanently fusible type. For example, the formaldehyde reaction products of such phenols as carbolic acid, resorcinol, and 2,2-bis(4-hydroxyphenyl)propane readily convert to infusible, insoluble compositions on the application of heat. On the other hand, some of the para alkylated phenols, as illustrated by p-tert-butylphenol, produce permanently fusible resins on reaction with formaldehyde. Even though fusible condensates are employed, however, insoluble, infusible products result when they are heated in combination with the epoxides and the Diphenolic Acid amides described.

Examples 27 to 29, inclusive, describe the preparation of some of the operable phenol-aldehyde condensates which may be used in combination with the polyepoxides and Diphenolic Acid amides to form the products herein described. It is to be noted that the three examples are drawn from distinct classes of phenols and are meant to be representative of the broad class of phenols. Thus, in Example 27, the phenol is a dihydroxy dinuclear phenol, in Example 28 an alkyl-substituted phenol, and in Example 29 a simple phenol. The examples, therefore, illustrate the unsubstituted monohydric phenols, the substituted monohydric phenols, and the polynuclear phenols.

*Example 27*

In a 3-liter 3-neck flask provided with a mechanical agitator, a thermometer and a reflux condenser was placed 912 parts of Bisphenol A, 960 parts of 37% aqueous formaldehyde and 2.3 parts of oxalic acid. With continuous agitation, the reaction mixture was heated to the reflux temperature and refluxing continued for a period of 1 hour. After permitting the reaction mixture to cool to around 50° C. the water layer was removed by decantation. The phenol-formaldehyde layer was then washed three times with water which in each case was removed by decantation. The last portion of water was removed by distillation at reduced pressure using a water aspirator system which gave pressure around 30–40 mm. The temperature during the removal of this last portion of water ranged from 70–90° C. The product, amounting to 1065 parts, was a clear, heavy, syrupy material.

*Example 28*

The procedure of preparation, including the dehydration step, was the same as that used in Example 27. A mixture of 1000 parts of p-tert-butylphenol, 1067 parts of 37% aqueous formaldehyde, and 10 parts of sodium hydroxide was used to give a final yield of 1470 parts of a clear, almost colorless syrupy product.

*Example 29*

Again a reaction procedure including the dehydration step, was the same as that used in Example 27. A mixture of 658 parts of phenol, 1400 parts of 37% aqueous formaldehyde, and 6.6 parts of sodium hydroxide was used to give a final yield of 1168 parts of a clear, syrupy product.

In Examples 22 to 29 inclusive, the aldehyde can be replaced by other aldehydes including acetaldehyde, propionaldehyde, n-butyraldehyde, isobutyraldehyde, valeraldehyde, capronaldehyde, heptaldehyde as well as the more complex aldehydes such as furfural.

In Examples 27 to 29 inclusive, the phenol can be replaced by other phenols including ortho, meta, and para cresol, 2,4 xylenol, 3,4 xylenol, 2,5 xylenol, 3,5 xylenol, 2,5 dibutyl phenol, p-phenyl phenol, 2 ethyl-phenol, p-cyclohexylphenol, 3 isopropyl phenol and p-tert-amylphenol.

GENERAL REACTION CONDITIONS AND CHARACTERISTICS OF THE NEW COMPOSITIONS

In the preparation of infusible and insoluble conversion products from epoxide compositions, one of the problems encountered is that of choosing satisfactory co-reactants to couple the epoxide groups of the polyepoxide in order to give the desired cross-linking and still obtain other properties such as flexibility and film-forming characteristics. Epoxide groups as is well-known, react with hydrogens attached to oxygen, nitrogen or sulfur, referred to as "active hydrogens," with the formation of hydroxyl groups and a linking of the oxygen, nitrogen or sulfur atom to the split epoxide residues. The amides employed herein contain at least two of these active hydrogens, i.e., those contained in the phenolic groups of the amide. If desired, an amide may be selected containing additional active hydrogens attached to amido nitrogen atoms. For instance, each amido group of the mono substituted amides derived from primary amines contain one of these amido active hydrogens, whereas each amido group of the amides derived from ammonia contain two. These additional active hydrogens offer a further means for cross-linking polyepoxides reacted with those amides.

Products prepared using an amide derived from a Diphenolic Acid and ammonia have been found to possess such properties as hardness, flexibility, good tensile strength, and a relatively high degree of impact resistance. These characteristics can probably be partially explained by the relatively high degree of cross-linking made possible by the four active hydrogens contained in each molecule of amide, permitting a cross-linked, net like structure to be formed with the epoxide resin and/or aldehyde condensate. When mono or di substituted amides are employed, i.e., those derived from primary or secondary amines, a number of desirable properties are imparted to the products prepared therefrom. For instance, the substitution of organic radicals for amido hydrogens in these amides has been found to increase the compatibility of the amides with the resins reacted therewith, resulting in the production of smoother, clearer conversion products. These organic substituents also serve to plasticize the products with the plasticizing action becoming readily apparent when the substituents contain in the range of about 8 carbon atoms or more. This method of plasticizing offers several advantages since the plasticizing groups are chemically bonded in the converted products preventing plasticizer migration or leaching out.

Substituted amides containing unsaturated organic radicals attached to the amido nitrogen atom are particularly valuable in that the unsaturated portions may be utilized for additional cross-linking. Flexible protective coating films, for instance, can be prepared from reaction mixtures containing these amides by spreading wet films and subsequently curing these films by exposing them to heat and air, so that the conversion reactions which occur are accompanied by polymerization through the unsaturated portions.

Further, by employing amides prepared from a Diphenolic Acid and a resinous amine, additional valuable conversion products may be obtained. For instance, amides prepared from rosin amine and a Diphenolic Acid, when reacted with a polyepoxide according to this invention, have been found to impart the resinous characteristics of hardness and gloss to the final conversion products. These conversion products are particularly valuable in that they show a high degree of chemical resistance.

In making the new compositions, the polyepoxides and Diphenolic Acid amides or such compositions modified with aldehyde condensates are admixed in suitable proportions and reaction will proceed merely by the application of heat. More specifically the reaction is effected by heating the mixtures at elevated temperatures, usually in the range of about 75–250° C. Catalysts are unnecessary, but in certain cases it may be desirable to speed up the reaction by the use of catalysts, such as boron trifluoride adducts, sodium phenoxides, and mineral acid type catalysts.

The reaction mixtures and final reaction products of this invention can be prepared by using varying ratios of epoxide to Diphenolic Acid amides. The quantities of reactants employed in a given instance will depend upon the characteristics desired in the final product. Flexible or rigid materials can be obtained from the proper selection of epoxide, Diphenolic Acid amide and phenol aldehyde condensate. In general, operable products are those in which the ratio of epoxide to Diphenolic Acid amide, on an equivalent weight basis, ranges from about 6:1 to 1:6 with the preferred range, because of the general overall characteristics, being from 2:1 to 1:2. In instances where an aldehyde condensate is used as a modifier, operable amounts on a weight basis of the combined epoxide and Diphenolic Acid amide range up to about 90%, but from a practical standpoint, the preferred percentage is about 10% to 35%. Equivalent weight as used above refers to the weight of polyepoxide per epoxide group, in the case of the polyepoxide, and the weight of the Diphenolic Acid amide per phenolic hydroxyl group, or active hydrogen attached to a nitrogen atom in the case of the amide.

Compositions containing the polyepoxides and the Diphenolic Acid amides or such compositions modified with aldehyde condensates can be used as admixtures or at varying intermediate stages of reaction. The initial admixtures or intermediate reaction products which are soluble in common organic solvents may be blended in solution in proper proportions and the solutions then applied as an impregnant for fabrics or paper, or for the formation of protective coating films. Subsequent heating functions to remove the solvent and bring about polymerization to the insoluble, infusible state. For other uses, the initial or intermediate mixture may be used without a solvent, giving directly a composition which, on the application of heat, converts to an infusible, insoluble final product.

In making the new compositions and products herein described, the polyepoxides and the Diphenolic Acid amide or such compositions modified with aldehyde condensates are usually used in regulated proportions without the addition of other materials. However, for certain uses, other components are often advantageously added, including filling and compounding materials, plasticizers, pigments, etc. The compositions which tend to give somewhat brittle products on conversion to the insoluble, infusible state can be advantageously compounded with plasticizers, although for most applications, it is possible to obtain suitable flexibility and toughness by regulating the proportions and types of reacting ingredients, thereby obviating the need for plasticizers.

The application of heat to the mixtures herein set forth involves several chemical reactions. It will be appreciated that the reactions involved are complex and the extent to which each takes place will vary with the temperature used in heat treating, the period of time therefor, and with the particular types of polyepoxides, aldehyde condensate, if used, and Diphenolic Acid amide chosen. While it is not desired to be limited by any theoretical explanation of the exact nature of these reactions, it seems probable that conversion to the final polymeric products is accompanied by direct polymerization of the epoxide groups inter se; reaction of the epoxide groups with methylol hydroxyl groups; reaction of the epoxide groups with phenolic hydroxyl groups, and reaction of epoxide groups with active hydrogen attached to a nitrogen atom, all of which takes place to some extent simultaneously in forming the final products.

The present invention provides a wide range of reaction compositions and products including initial mixtures of the polyepoxides, aldehyde condensates, and the Diphenolic Acid amide, partial or intermediate reaction products of such mixtures and compositions containing such intermediate reaction products as well as final reaction products. In general, the initial mixtures, as well as the intermediate reaction products unless too highly polymerized, are soluble in solvents of the lacquer type, such as ketone or ester solvents.

In addition to having outstanding physical properties, such as hardness, toughness and flexibility, the final infusible, insoluble products have outstanding chemical properties, such as high resistance to oxidation, water, alkali, acids and organic solvents. It has also been observed that the final conversion products possess unusually good adhesion to most surfaces including metal, glass, wood and plastics. This property of outstanding adhesion to a wide variety of surfaces gives the subject products high potential value for use in formulating adhesives. This property is also of extreme value in formulating protective coating films for use on many types of surfaces. The adhesion characteristics are probably due to the fact that even in the converted, infusible state, the compositions contain a relatively high percentage of highly polar groups, such as ether groups, ester groups, and alcoholic and phenolic hydroxyl groups. Despite the high percentage of polar groups in the insoluble, infusible products of this invention the tolerance for water is unusually low, apparently due to the high molecular weight and rigid cross-linked structure of the final compositions.

EXPERIMENTAL

Examples 30 to 234, inclusive, illustrate the preparation of insoluble, infusible protective coating films from the compositions of this invention. In the preparation of the compositions for heat curing to form the protective coating films, each of the Diphenolic Acid amides was dissolved in dioxane at 50% non-volatile. The polyepoxides, with the exception of epoxidized polyesters, were dissolved in methyl ethyl ketone to a non-volatile content of 40–60%. In certain instances it may be desirable to use a small amount of dimethyl sulfoxide or similar solvent to help effect the solubilization of the Diphenolic Acid amides. The epoxidized polyesters were used at the non-volatile and in the solvent in which they were prepared. The aldehyde condensates were dissolved in a mixture of methyl ethyl ketone and butanol to a non-volatile content of 40–60%. Mixtures of the Diphenolic Acid amides and polyepoxides or such compositions modified with aldehyde condensates were found to be stable up to six weeks or more at room temperature. Mixtures of the solutions were spread on panels with a .002" Bird applicator and the films were baked for periods of 30 to 90 minutes at temperatures ranging from 150–200° C. Proportions as used in the following table refer to parts by weight and are based on the non-volatile content of the solutions of reactants.

| Example | Parts of polyepoxide | Parts of DPA amide | Parts of aldehyde condensate | Parts NaOEt catalyst | Baking schedule, min./T., ° C. | Film resistance | |
|---|---|---|---|---|---|---|---|
| | | | | | | Boiling water (hr.) | 5% aqueous NaOH at 25° C. (hr.) |
| 30 | 175 Epon 1007 | 39.7 Ex. 1 | | | 30/200 | 0.83 | 48 |
| 31 | do | 39.7 Ex. 1 | | 0.54 | 30/150 | 0.17 | 23 |
| 32 | 350 Epon 864 | 131.0 Ex. 1 | | 1.09 | 30/150 | 0.08 | 48 |
| 33 | 175 Epon 1007 | 13.1 Ex. 1 | | 0.54 | 30/150 | 0.08 | 48 |
| 34 | 90 Epon 1004 | 14.2 Ex. 2 | | 0.54 | 30/150 | 0.08 | 48 |
| 35 | 300 Epon 1009 | 14.2 Ex. 2 | | 0.54 | 30/150 | 0.08 | 48 |
| 36 | 500 Epon 1001 | 151.0 Ex. 3 | | 5.4 | 30/150 | 0.08 | 48 |
| 37 | 300 Epon 1009 | 151.0 Ex. 3 | | 0.54 | 30/150 | 0.08 | 48 |
| 38 | 500 Epon 1001 | 146.0 Ex. 4 | | 5.4 | 30/200 | 0.08 | 48 |
| 39 | 90 Epon 1004 | 14.6 Ex. 4 | | 0.54 | 30/200 | 16 | 48 |
| 40 | 350 Epon 864 | 131.0 Ex. 4 | | 5.4 | 30/200 | 16 | 48 |
| 41 | 500 Epon 1001 | 113.0 Ex. 5 | | 5.4 | 30/150 | 0.08 | 48 |

| Example | Parts of poly-epoxide | Parts of DPA amide | Parts of aldehyde condensate | Parts NaOEt catalyst | Baking schedule, min./T., °C. | Film resistance Boiling water (hr.) | Film resistance 5% aqueous NaOH at 25° C. (hr.) |
|---|---|---|---|---|---|---|---|
| 42 [1] | 300 Epon 1009 | 11.3 Ex. 5 | | 0.54 | 30/150 | 0.83 | 5 |
| 43 [1] | 500 Epon 1001 | 131.0 Ex. 6 | | 5.4 | 30/150 | 0.08 | 48 |
| 44 | ----do---- | 199.0 Ex. 6 | | 5.4 | 30/150 | 0.08 | 48 |
| 45 | 350 Epon 864 | 95.0 Ex. 7 | | 10.9 | 30/200 | 2.5 | 48 |
| 46 | 175 Epon 1007 | 9.5 Ex. 7 | | 0.27 | 30/200 | 1.5 | 48 |
| 47 | ----do---- | 28.0 Ex. 7 | | 0.54 | 30/150 | 0.17 | 3.5 |
| 48 | 350 Epon 864 | 142.0 Ex. 7 | | 5.4 | 30/150 | 4.0 | 48 |
| 49 | 175 Epon 1007 | 4.3 Ex. 7 | | 0.54 | 30/200 | 0.08 | 48 |
| 50 | 464 Epon 1004 | 60.0 Ex. 8 | | 16.0 | 30/175 | 16.0 | 24 |
| 51 | 400 Epon 1007 | 24.0 Ex. 8 | | 13.0 | 30/175 | 16.0 | 24 |
| 52 | 560 Epon 1001 | 108.0 Ex. 9 | | 2.0 | 30/175 | 18.0 | 72 |
| 53 | 464 Epon 1004 | 54.0 Ex. 9 | | 1.6 | 30/175 | 18.0 | 72 |
| 54 | 400 Epon 1007 | 21.6 Ex. 9 | | 1.4 | 30/175 | 18.0 | 72 |
| 55 | 560 Epon 1001 | 195.0 Ex. 10 | | 2.3 | 30/175 | 18.0 | 72 |
| 56 | 464 Epon 1004 | 97.0 Ex. 10 | | 1.7 | 30/175 | 18.0 | 72 |
| 57 | 400 Epon 1007 | 39.0 Ex. 10 | | 1.3 | 30/175 | 18.0 | 72 |
| 58 | 332 Ex. 18 | 132.0 Ex. 1 | | 5.4 | 30/175 | 1.5 | 0.87 |
| 59 | 292 Ex. 19 | 30.0 Ex. 2 | | 5.4 | 30/200 | 0.08 | 1.0 |
| 60 | 332 Ex. 18 | 151.0 Ex. 3 | | 5.4 | 30/150 | 32.0 | 0.17 |
| 61 | 288 Ex. 17 | 68.0 Ex. 3 | | 5.4 | 30/200 | 0.5 | 1.0 |
| 62 | 332 Ex. 18 | 108.0 Ex. 4 | | 5.4 | 30/200 | 16.0 | 0.17 |
| 63 | 292 Ex. 19 | 179.0 Ex. 4 | | 5.4 | 30/200 | 5.0 | 0.17 |
| 64 | 332 Ex. 18 | 113.0 Ex. 5 | | 5.4 | 30/150 | 32.0 | 0.75 |
| 65 | 288 Ex. 17 | 51.0 Ex. 5 | | 5.4 | 30/200 | 0.25 | 1.0 |
| 66 | 288 Ex. 17 | 133 Ex. 6 | | 5.4 | 30/200 | 16.0 | 0.75 |
| 67 | 292 Ex. 19 | 133 Ex. 6 | | 5.4 | 30/200 | 8.3 | 7.0 |
| 68 | 288 Ex. 17 | 95 Ex. 7 | | 5.4 | 30/150 | 16.0 | 24.0 |
| 69 | 292 Ex. 18 | 95 Ex. 7 | | 5.4 | 30/150 | 21.0 | 5.0 |
| 70 | 274 Ex. 19 | 121 Ex. 8 | | 5.4 | 30/200 | 11.0 | 32.0 |
| 71 | 332 Ex. 18 | 55 Ex. 8 | | 5.4 | 30/200 | 14.0 | 3.0 |
| 72 | 288 Ex. 17 | 108 Ex. 9 | | 5.4 | 30/200 | 24.0 | 1.0 |
| 73 | 274 Ex. 19 | 41 Ex. 10 | | 5.4 | 30/200 | 0.17 | 3.0 |
| 74 | 332 Ex. 18 | 195 Ex. 10 | | 5.4 | 30/200 | 24.0 | 8.0 |
| 75 | 332 Ex. 18 | 180 Ex. 11 | | 5.4 | 30/200 | 11.0 | 32.0 |
| 76 | 288 Ex. 17 | 183 Ex. 8 | | 5.4 | 30/200 | 24.0 | 32.0 |
| 77 | 290 Ex. 17 | 120 Ex. 13 | | 0.87 | 30/175 | 8.5 | 4.5 |
| 78 | 202 Ex. 21 | 133 Ex. 1 | | | 30/200 | 19.0 | 48.0 |
| 79 | 150 Ex. 20 | 133 Ex. 1 | | 2.8 | 60/200 | 19.0 | 3.0 |
| 80 | 202 Ex. 21 | 142 Ex. 2 | | | 30/200 | 19.0 | 3.0 |
| 81 | 150 Ex. 20 | 156 Ex. 3 | | 3.0 | 30/200 | 19.0 | 1.0 |
| 82 | 202 Ex. 21 | 179 Ex. 4 | | 1.9 | 30/200 | 11.0 | 5.0 |
| 83 | 202 Ex. 21 | 133 Ex. 5 | | | 30/200 | 19.0 | 8.0 |
| 84 | 202 Ex. 21 | 199 Ex. 6 | | | 30/200 | 19.0 | 2.0 |
| 85 | 150 Ex. 20 | 199 Ex. 6 | | 3.4 | 30/200 | 19.0 | 2.0 |
| 86 | 150 Ex. 20 | 99 Ex. 6 | | 3.4 | 30/200 | 19.0 | 1.0 |
| 87 | 150 Ex. 20 | 95 Ex. 7 | | 2.5 | 30/185 | 16.0 | 3.0 |
| 88 | 202 Ex. 21 | 43 Ex. 7 | | | 30/200 | 19.0 | 3.0 |
| 89 | 150 Ex. 20 | 43 Ex. 7 | | 2.5 | 60/200 | 19.0 | 8.0 |
| 90 | 202 Ex. 21 | 183 Ex. 8 | | | 30/200 | 24.0 | 32.0 |
| 91 | 202 Ex. 21 | 49 Ex. 9 | | | 60/200 | 24.0 | 3.0 |
| 92 | 202 Ex. 21 | 195 Ex. 10 | | | 60/200 | 24.0 | 32.0 |
| 93 | 150 Ex. 20 | 180 Ex. 12 | | 3.4 | 60/200 | 24.0 | 8.0 |
| 94 | 202 Ex. 21 | 108 Ex. 12 | | | 30/200 | 24.0 | 8.0 |
| 95 | 300 Ex. 20 | 240 Ex. 13 | | 0.9 | 300/175 | 8.5 | 24.0 |
| 96 | 125 Epon 1001 | 32.1 Ex. 1 | 125 Ex. 28 | 1.3 | 30/200 | 19.0 | 106.0 |
| 97 | 438 Epon 1007 | 8.3 Ex. 1 | 438 Ex. 28 | 1.3 | 30/200 | 19.0 | 96.0 |
| 98 | 146 Ex. 19 | 33.4 Ex 1 | 83 Ex. 28 | 2.7 | 30/200 | 19.0 | 104.0 |
| 99 | 144 Ex. 17 | 16.7 Ex. 1 | 144 Ex. 27 | 2.7 | 30/200 | 19.0 | 4.0 |
| 100 | 101 Ex. 21 | 67.0 Ex. 1 | 101 Ex. 28 | | 30/200 | 16.0 | 48.0 |
| 101 | 300 Epon 1009 | 7.1 Ex. 2 | 150 Ex. 28 | 0.5 | 30/200 | 19.0 | 96.0 |
| 102 | 170 Epon 864 | 71.0 Ex. 2 | 131 Ex. 27 | 2.7 | 30/200 | ---- | 106 |
| 103 | 166 Ex. 18 | 70.9 Ex. 2 | 166 Ex. 28 | 2.7 | 30/200 | 8 | 27 |
| 104 | 146 Ex. 19 | 35.4 Ex. 2 | 36.5 Ex. 27 | 2.7 | 30/200 | 19 | 8 |
| 105 | 101 Ex. 21 | 71.0 Ex. 2 | 101 Ex. 28 | | 30/200 | 16 | 8 |
| 106 | 125 Epon 1001 | 37.9 Ex. 3 | 125 Ex. 28 | 1.3 | 30/200 | 19 | 106 |
| 107 | 225 Epon 1004 | 18.9 Ex. 3 | 225 Ex. 27 | 1.3 | 30/200 | 19 | 96 |
| 108 | 300 Epon 1009 | 15.1 Ex. 3 | 300 Ex. 29 | 0.5 | 30/200 | 19 | 32 |
| 109 | 144 Ex. 17 | 75.6 Ex. 3 | 38 Ex. 28 | 2.7 | 30/200 | 8 | 28 |
| 110 | 166 Ex. 18 | 75.6 Ex. 3 | 166 Ex. 27 | 2.7 | 30/200 | 19 | 2 |
| 111 | 75 Ex. 20 | 38.0 Ex. 3 | 37.5 Ex. 29 | 1.5 | 30/200 | 16 | 7 |
| 112 | 101 Ex. 21 | 76.0 Ex. 3 | 51 Ex. 28 | | 30/200 | 16 | 48 |
| 113 | 125 Epon 1001 | 9.2 Ex. 4 | 62.5 Ex. 29 | 1.3 | 30/200 | 4 | 106 |
| 114 | 225 Epon 1004 | 36.4 Ex. 4 | 112 Ex. 28 | 1.3 | 30/200 | 19 | 96 |
| 115 | 300 Epon 1009 | 3.6 Ex. 4 | 300 Ex. 27 | 0.5 | 30/200 | 19 | 96 |
| 116 | 146 Ex. 19 | 18.2 Ex. 4 | 146 Ex. 28 | 2.7 | 30/200 | 19 | 104 |
| 117 | 125 Epon 1001 | 28.5 Ex. 5 | 93.8 Ex. 28 | 1.3 | 30/200 | 19 | 106 |
| 118 | 300 Epon 1009 | 5.7 Ex. 5 | 300 Ex. 29 | 0.5 | 30/200 | 3 | 96 |
| 119 | 146 Ex. 19 | 56.9 Ex. 5 | 146 Ex. 27 | 2.7 | 30/200 | 19 | 4 |
| 120 | 75 Ex. 20 | 57.0 Ex. 5 | 19 Ex. 28 | 1.3 | 60/200 | 4 | 4 |
| 121 | 125 Epon 1001 | 49.6 Ex. 6 | 125 Ex. 28 | 1.3 | 30/200 | 19 | 106 |
| 122 | 225 Epon 1004 | 49.7 Ex. 6 | 225 Ex. 29 | 1.3 | 30/200 | 19 | 22 |
| 123 | 300 Epon 1009 | 9.9 Ex. 6 | 300 Ex. 27 | 0.5 | 30/200 | 19 | 32 |
| 124 | 144 Ex. 17 | 49.7 Ex. 6 | 144 Ex. 28 | 2.7 | 30/200 | 19 | 32 |
| 125 | 166 Ex. 18 | 99.5 Ex. 6 | 41.5 Ex. 27 | 2.7 | 30/200 | 19 | 7 |
| 126 | 146 Ex. 19 | 99.5 Ex. 6 | 146 Ex. 29 | 2.7 | 30/200 | 8 | 28 |
| 127 | 75 Ex. 20 | 99.0 Ex. 6 | 37.5 Ex. 27 | 3.4 | 30/200 | 16 | 48 |
| 128 | 101 Ex. 21 | 99.0 Ex. 6 | 50.5 Ex. 29 | | 30/200 | 16 | 48 |
| 129 | 175 Epon 864 | 23.6 Ex. 7 | 170 Ex. 28 | 2.7 | 30/200 | 19 | 106 |
| 130 | 225 Epon 1004 | 14.2 Ex. 7 | 112.5 Ex. 27 | 1.3 | 30/200 | 19 | 106 |
| 131 | 438 Epon 1007 | 28.4 Ex. 7 | 430 Ex. 29 | 1.3 | 30/200 | 4 | 30 |
| 132 | 292 Ex. 19 | 95.1 Ex. 7 | 292 Ex. 28 | 5.4 | 30/200 | 8 | 32 |
| 133 | 166 Ex. 18 | 5.9 Ex. 7 | 83 Ex. 27 | 2.7 | 30/200 | 19 | 32 |
| 134 | 150 Ex. 20 | 48.0 Ex. 7 | 75 Ex. 27 | 2.5 | 30/200 | 16 | 8 |
| 135 | 175 Epon 864 | 32.0 Ex. 8 | 88 Ex. 27 | 2.7 | 30/200 | 16 | 48 |
| 136 | 225 Epon 1004 | 23.0 Ex. 8 | 150 Ex. 27 | 1.3 | 30/200 | 16 | 48 |
| 137 | 137 Ex. 19 | 32.0 Ex. 8 | 35 Ex. 28 | 2.7 | 30/200 | 16 | 48 |
| 138 | 166 Ex. 18 | 92.0 Ex. 8 | 166 Ex. 28 | 2.7 | 30/200 | 16 | 3 |
| 139 | 150 Ex. 20 | 183.0 Ex. 8 | 150 Ex. 29 | 3.4 | 30/200 | 24 | 24 |
| 140 | 150 Ex. 20 | 183.0 Ex. 8 | 39 Ex. 28 | 3.4 | 30/200 | 16 | 29 |

[1] Catalyst employed was sodium 4,4-bis(4-hydroxyphenyl) pentanate.

| Example | Parts of polyepoxide | Parts of DPA amide | Parts of aldehyde condensate | Parts NaOEt catalyst | Baking schedule, min./T., °C. | Film resistance Boiling water (hr.) | Film resistance 5% aqueous NaOH at 25° C. (hr.) |
|---|---|---|---|---|---|---|---|
| 141 | 202 Ex. 21 | 73.0 Ex. 8 | 101 Ex. 27 |  | 30/200 | 16 | 48 |
| 142 | 250 Epon 1001 | 7.0 Ex. 9 | 34 Ex. 28 | 2.7 | 30/200 | 16 | 48 |
| 143 | 166 Ex. 17 | 7.0 Ex. 9 | 21 Ex. 27 | 2.7 | 30/200 | 2 | 3 |
| 144 | 150 Ex. 20 | 108.0 Ex. 9 | 113 Ex. 27 | 3.4 | 30/200 | 16 | 8 |
| 145 | 202 Ex. 21 | 108.0 Ex. 9 | 25 Ex. 29 |  | 30/200 | 16 | 29 |
| 146 | 202 Ex. 21 | 49.0 Ex. 9 | 101 Ex. 28 |  | 30/200 | 8 | 48 |
| 147 | 225 Epon 1004 | 12.0 Ex. 10 | 56 Ex. 29 | 1.3 | 30/200 | 12 | 48 |
| 148 | do | 49.0 Ex. 10 | 225 Ex. 27 | 1.3 | 30/200 | 16 | 30 |
| 149 | 150 Ex. 20 | 41.0 Ex. 10 | 113 Ex. 27 | 3.4 | 30/200 | 16 | 48 |
| 150 | 202 Ex. 21 | 195 Ex. 10 | 25 Ex. 28 |  | 30/200 | 16 | 48 |
| 151 | 438 Epon 1007 | 23.0 Ex. 12 | 220 Ex. 28 | 1.3 | 300/200 | 16 | 48 |
| 152 | 150 Epon 1007 | 180.0 Ex. 12 | 38 Ex. 27 | 3.4 | 30/200 | 16 | 48 |
| 153 | 300 Epon 1009 | 10.0 Ex. 11 | 75 Ex. 29 | 0.5 | 30/200 | 16 | 48 |
| 154 | 137 Ex. 19 | 23.0 Ex. 11 | 68 Ex. 27 | 2.7 | 30/200 | 16 | 48 |
| 155 | 560 Epon 1001 | 120.0 Ex. 13 | 560 Ex. 28 | 1.7 | 30/175 | 17 | 24 |
| 156 | 290 Ex. 17 | 120 Ex. 13 | 290 Ex. 28 | 0.9 | 30/175 | 9 | 5 |
| 157 | 300 Ex. 20 | 240 Ex. 13 | 300 Ex. 28 | 0.9 | 30/175 | 17 | 24 |
| 158 | 175 Epon 864 | 332 Ex. 1 | 175 Ex. 25 | 2.7 | 30/200 | 16 | 96 |
| 159 | 438 Epon 1007 | 8.4 Ex. 1 | 438 Ex. 22 | 1.4 | 30/200 | 16 | 96 |
| 160 | 300 Epon 1009 | 13.3 Ex. 1 | 37.5 Ex. 26 | 0.4 | 30/200 | 16 | 96 |
| 161 | 146 Ex. 19 | 66.3 Ex. 1 | 73 Ex. 25 | 2.7 | 30/200 | 0.5 | 104 |
| 162 | 150 Ex. 20 | 60 Ex. 1 | 113 Ex. 26 | 3.4 | 30/200 | 16 | 30 |
| 163 | 202 Ex. 21 | 133 Ex. 1 | 202 Ex. 24 |  | 30/200 | 16 | 30 |
| 164 | 175 Epon 864 | 70.9 Ex. 2 | 43.8 Ex. 26 | 2.7 | 30/200 | 16 | 96 |
| 165 | 225 Epon 1004 | 35.4 Ex. 2 | 225 Ex. 24 | 1.4 | 30/200 | 16 | 96 |
| 166 | 146 Ex. 19 | 70.9 Ex. 2 | 73 Ex. 22 | 2.7 | 30/200 | 3 | 32 |
| 167 | 166 Ex. 18 | 70.9 Ex. 2 | 41.4 Ex. 24 | 2.7 | 30/200 | 16 | 8 |
| 168 | 150 Ex. 20 | 142 Ex. 2 | 75 Ex. 25 | 3.4 | 30/200 | 16 | 22 |
| 169 | 202 Ex. 21 | 30 Ex. 2 | 25 Ex. 23 |  | 30/200 | 16 | 22 |
| 170 | 125 Epon 1001 | 18.9 Ex. 3 | 125 Ex. 26 | 1.4 | 30/200 | 9 | 96 |
| 171 | 225 Epon 1004 | 37.8 Ex. 3 | 225 Ex. 25 | 1.4 | 30/200 | 16 | 96 |
| 172 | 438 Epon 1007 | 18.9 Ex. 3 | 438 Ex. 24 | 1.4 | 30/200 | 16 | 96 |
| 173 | 300 Epon 1009 | 7.6 Ex. 3 | 150 Ex. 23 | 0.4 | 30/200 | 16 | 96 |
| 174 | 146 Ex. 19 | 75.6 Ex. 3 | 146 Ex. 24 | 2.7 | 30/200 | 3 | 30 |
| 175 | 160 Ex. 20 | 156 Ex. 3 | 19 Ex. 22 | 3.4 | 60/200 | 16 | 24 |
| 176 | 202 Ex. 21 | 142 Ex. 3 | 51 Ex. 24 |  | 30/200 | 16 | 24 |
| 177 | 175 Epon 864 | 36.5 Ex. 4 | 43.8 Ex. 26 | 2.7 | 30/200 | 16 | 96 |
| 178 | 225 Epon 1004 | 18.2 Ex. 4 | 56.3 Ex. 22 | 1.4 | 30/200 | 16 | 96 |
| 179 | 300 Epon 1009 | 14.6 Ex. 4 | 300 Ex. 24 | 0.4 | 30/200 | 16 | 96 |
| 180 | 146 Ex. 19 | 44.8 Ex. 4 | 73 Ex. 23 | 2.7 | 30/200 | 0.5 | 8 |
| 181 | 150 Ex. 20 | 38 Ex. 4 | 75 Ex. 23 | 3.4 | 30/200 | 16 | 6 |
| 182 | 202 Ex. 21 | 179 Ex. 4 | 101 Ex. 26 | 3.4 | 30/200 | 16 | 26 |
| 183 | 175 Epon 864 | 51.9 Ex. 5 | 87.5 Ex. 23 | 2.7 | 30/200 | 16 | 96 |
| 184 | 225 Epon 1004 | 28.4 Ex. 5 | 56.3 Ex. 25 | 1.4 | 30/200 | 16 | 96 |
| 185 | 438 Epon 1007 | 7.1 Ex. 5 | 101 Ex. 24 | 1.4 | 30/200 | 6 | 8 |
| 186 | 166 Ex. 18 | 56.9 Ex. 5 | 166 Ex. 22 | 2.7 | 30/200 | 16 | 28 |
| 187 | 144 Ex. 17 | 56.9 Ex. 5 | 36.0 Ex. 26 | 2.7 | 30/200 | 16 | 6 |
| 188 | 150 Ex. 20 | 113 Ex. 5 | 150 Ex. 23 | 3.4 | 30/200 | 16 | 6 |
| 189 | 202 Ex. 21 | 113 Ex. 5 | 25 Ex. 26 |  | 30/200 | 16 | 96 |
| 190 | 175 Epon 864 | 49.7 Ex. 6 | 175 Ex. 24 | 2.7 | 30/200 | 16 | 96 |
| 191 | 125 Epon 1001 | 49.7 Ex. 6 | 125 Ex. 23 | 1.4 | 30/200 | 16 | 96 |
| 192 | 225 Epon 1004 | 24.9 Ex. 6 | 112.5 Ex. 22 | 1.4 | 30/200 | 3 | 6 |
| 193 | 144 Ex. 17 | 99.5 Ex. 6 | 144 Ex. 24 | 2.7 | 30/200 | 5 | 28 |
| 194 | 166 Ex. 18 | 15.0 Ex. 6 | 83 Ex. 25 | 2.7 | 30/200 | 16 | 30 |
| 195 | 150 Ex. 20 | 199.0 Ex. 6 | 75 Ex. 24 | 3.4 | 30/200 | 16 | 26 |
| 196 | 202 Ex. 21 | 40.0 Ex. 6 | 202 Ex. 22 |  | 30/200 | 16 | 96 |
| 197 | 175 Epon 864 | 47.5 Ex. 7 | 175 Ex. 22 | 2.7 | 30/200 | 16 | 96 |
| 198 | 225 Epon 1004 | 11.9 Ex. 7 | 56.3 Ex. 25 | 1.4 | 30/200 | 9 | 96 |
| 199 | 438 Epon 1007 | 11.9 Ex. 7 | 438 Ex. 26 | 1.4 | 30/200 | 16 | 96 |
| 200 | 300 Epon 1009 | 9.5 Ex. 7 | 37.5 Ex. 24 | 0.4 | 30/200 | 3 | 32 |
| 201 | 146 Ex. 19 | 47.5 Ex. 7 | 73.0 Ex. 22 | 2.7 | 30/200 | 3 | 1 |
| 202 | 144 Ex. 17 | 23.8 Ex. 7 | 72 Ex. 23 | 2.7 | 30/200 | 16 | 22 |
| 203 | 150 Ex. 20 | 95 Ex. 7 | 113 Ex. 22 | 3.4 | 30/200 | 2 | 24 |
| 204 | 101 Ex. 21 | 23.0 Ex. 7 | 101 Ex. 25 |  | 30/200 | 16 | 48 |
| 205 | 438 Epon 1007 | 11.3 Ex. 8 | 110 Ex. 26 | 1.4 | 30/200 | 16 | 3 |
| 206 | 166 Ex. 18 | 92.0 Ex. 8 | 166 Ex. 23 | 2.7 | 30/200 | 10.5 | 30 |
| 207 | 137 Ex. 19 | 92.0 Ex. 8 | 137 Ex. 24 | 2.7 | 30/200 | 9.5 | 30 |
| 208 | 144 Ex. 17 | 92.0 Ex. 8 | 144 Ex. 22 | 2.7 | 30/200 | 16 | 30 |
| 209 | 150 Ex. 20 | 183.0 Ex. 8 | 150 Ex. 22 | 3.4 | 30/200 | 16 | 30 |
| 210 | 202 Ex. 21 | 73 Ex. 8 | 76 Ex. 23 |  | 30/200 | 16 | 48 |
| 211 | 175 Epon 864 | 13.5 Ex. 9 | 43.7 Ex. 22 | 2.7 | 30/200 | 16 | 48 |
| 212 | 250 Epon 1001 | 27 Ex. 9 | 125 Ex. 22 | 2.7 | 30/200 | 10 | 24 |
| 213 | 144 Ex. 17 | 54 Ex. 9 | 144 Ex. 22 | 2.7 | 30/200 | 16 | 30 |
| 214 | 150 Ex. 20 | 108 Ex. 9 | 75 Ex. 24 | 3.4 | 30/200 | 16 | 22 |
| 215 | 202 Ex. 21 | 108 Ex. 9 | 51 Ex. 26 |  | 30/200 | 16 | 48 |
| 216 | 250 Epon 1001 | 12 Ex. 10 | 63 Ex. 24 | 2.7 | 30/200 | 10 | 30 |
| 217 | 166 Ex. 18 | 98 Ex. 10 | 166 Ex. 24 | 2.7 | 30/200 | 9 | 24 |
| 218 | 137 Ex. 19 | 98 Ex. 10 | 137 Ex. 23 | 2.7 | 30/200 | 16 | 3 |
| 219 | 150 Ex. 20 | 41 Ex. 10 | 19 Ex. 22 | 3.4 | 60/200 | 16 | 94 |
| 220 | 202 Ex. 21 | 195 Ex. 10 | 76 Ex. 25 |  | 30/200 | 16 | 48 |
| 221 | 300 Epon 1009 | 4.5 Ex. 12 | 75 Ex. 25 | 0.5 | 30/200 | 16 | 30 |
| 222 | 150 Ex. 18 | 180 Ex. 12 | 38 Ex. 23 | 3.4 | 30/200 | 8.5 | 8.5 |
| 223 | 560 Epon 1001 | 120 Ex. 13 | 560 Ex. 23 | 1.7 | 30/175 | 8.5 | 4.5 |
| 224 | 290 Ex. 17 | 120 Ex. 13 | 290 Ex. 23 | 0.9 | 30/175 | 9 | 24 |
| 225 | 300 Ex. 20 | 240 Ex. 13 | 300 Ex. 23 | 0.9 | 30/175 | 0.5 | 50+ |
| 226 | 10 Epon 1001 | 5 Ex. 14 |  | 0.2 | 30/200 | 5.5 | 6 |
| 227 | 5 Epon 562 | 15 Ex. 16 |  | 0.2 | 30/200 | 16+ | 50+ |
| 228 | 10 Epon 1004 | 2.5 Ex. 15 |  | 0.5 | 30/200 | 0.5 | 50+ |
| 229 | do | 15 Ex. 14 | 10 Ex. 27 | 0.2 | 30/200 | 16+ | 50+ |
| 230 | 15 Epon 562 | 10 Ex. 15 | 5 Ex. 29 | 0.5 | 30/200 | 16+ | 50+ |
| 231 | 5 Epon 1001 | 5 Ex. 16 | 15 Ex. 28 | 0.2 | 30/200 | 1 | 0.25 |
| 232 | 3 Epon 1001 | 10 Ex. 15 | 20 Ex. 23 | 0.4 | 30/200 | 16+ | 50+ |
| 233 | 10 Epon 1004 | 15 Ex. 16 | 5 Ex. 22 | 0.7 | 30/200 | 16+ | 50+ |
| 234 | 10 Epon 562 | 5 Ex. 14 | 5 Ex. 26 | 0.4 | 30/200 | 1 | 50+ |

The following examples illustrate the preparation of modified conversion products by suitably adjusting the reactants employed.

*Example 235*

A hard, highly lustrous conversion product was prepared by admixing 292 parts of Example 10 (in a 50% dioxane solution) with 28 parts of Example 17 (in a 50% xylene solution), spreading the mixture on plates at .002" wet film thickness and curing for 30 minutes at 200° C. The cured products, in addition to being smooth and glossy, were tack-free even at elevated temperature of conversion, and withstood boiling water for 5 hours.

*Example 236*

A hard, highly lustrous conversion product was prepared by admixing 195 parts of Example 10 (in a 50% dioxane solution) with 15 parts of Example 20 and curing .002" wet films prepared from the mixture by heating the films for 30 minutes at 200° C. The cured products, in addition to being smooth and glossy, were tack-free even at the elevated temperature of conversion, and withstood boiling water for 5 hours.

While it may be desirable to use a lacquer type solvent in the preparation of these reaction mixtures, in other instances, such as in the manufacture of molded articles, a solvent would ordinarily not be used as the resins and a catalyst, if used, can be placed directly into the mold. In the preparation of adhesive materials, ordinarily no solvent is necessary in those cases where relatively low melting point resins are used, although a solvent in some cases may be desirable.

It should be appreciated that the invention is not to be construed to be limited by the illustration examples. It is possible to produce still other embodiments without departing from the inventive concept herein disclosed. This application is a continuation-in-part of the Greenlee copending applications S.N. 581,316, 581,317 and 585,617, filed April 30, 1956, April 30, 1956, and May 18, 1956, respectively, now abandoned.

It is claimed and desired to secure by Letters Patent:

1. A composition of matter comprising the condensation product of (A) the amide of (*a*) a 4,4 bis-hydroxyaryl)pentanoic acid wherein the hydroxyaryl radical is a hydroxyphenyl radical and is free from substituents other than chloro, bromo, nitro and alkyl groups of from 1–5 carbon atoms and (*b*) a member of the group consisting of (1) a monoamine, and (2) ammonia and (B) an organic polyepoxide containing an average of more than one oxirane group per molecule and being free of groups reactive with said amide (A) other than hydroxyl, carboxyl and oxirane.

2. The composition of claim 1 wherein the pentanoic acid is 4,4-bis(4-hydroxyphenyl) pentanoic acid.

3. The composition of claim 1 wherein the hydroxyaryl radical of the pentanoic acid is alkyl substituted.

4. The composition of claim 1 wherein said polyepoxide (B) is a complex epoxide which is a polymeric polyhydric alcohol having alternating aliphatic chains and aromatic nuclei united through ether oxygen and terminating in epoxy-substituted aliphatic chains.

5. The composition of matter of claim 1 wherein said polyepoxide (B) is an epoxidized polyester of tetrahydrophthalic acid and a glycol, wherein the epoxy oxygen atoms are each linked to adjacent carbon atoms in the nucleus of said acid.

6. The composition of matter of claim 1 wherein said polyepoxide (B) is an aliphatic polyepoxide selected from the group consisting of bis(glycidyloxy) butene, triglycidyl glyceryl ether, diepoxy butane, and diglycide ether.

7. A composition of matter comprising the condensation product of (A) the amide of (*a*) a 4,4 bis(hydroxyaryl)pentanoic acid wherein the hydroxyaryl radical is a hydroxyphenyl radical and is free from substituents other than chloro, bromo, nitro and alkyl groups of from 1–5 carbon atoms and (*b*) a member of the group consisting of (1) a monoamine and (2) ammonia, (B) a fusible condensate of an aldehyde with at least one organic derivative selected from the group consisting of phenol, urea, thiourea, melamine, toluenesulfonamide and alkyl substituted derivatives thereof, and (C) an organic polyepoxide containing an average of more than one oxirane group per molecule and being free of groups reactive with said amide (A) and said condensate (B) other than hydroxyl, carboxyl and oxirane.

8. A composition of matter comprising the condensation product of (A) the amide of (*a*) a 4,4-bis(hydroxyaryl) pentanoic acid wherein the hydroxyaryl radical is a hydroxyphenyl radical and is free from substituents other than chloro, bromo, nitro and alkyl groups of from 1–5 carbon atoms and (*b*) a member of the group consisting of (1) a monoamine and (2) ammonia, (B) a fusible condensate of an aldehyde with a phenol and (C) an organic polyepoxide containing an average of more than one oxirane group per molecule and being free of groups reactive with said amide (A) and said condensate (B) other than hydroxyl, carboxyl and oxirane.

References Cited in the file of this patent

UNITED STATES PATENTS

| | | |
|---|---|---|
| 2,001,430 | Meigs | May 14, 1935 |
| 2,510,886 | Greenlee | June 6, 1950 |
| 2,511,913 | Greenlee | June 20, 1950 |
| 2,521,912 | Greenlee | Sept. 12, 1950 |

FOREIGN PATENTS

| | | |
|---|---|---|
| 525,881 | Great Britain | Sept. 6, 1940 |

OTHER REFERENCES

Bader et al.: 76 J.A.C.S. 4465–4466 (September 5, 1954).

UNITED STATES PATENT OFFICE

CERTIFICATE OF CORRECTION

Patent No. 2,907,740

October 6, 1959

Sylvan O. Greenlee

It is hereby certified that error appears in the printed specification of the above numbered patent requiring correction and that the said Letters Patent should read as corrected below.

Column 2, line 34, for the Serial No. "480,300" read -- 489,300 --; column 7, lines 3, 4, 5, and 6, strike out "tion entitled "Armeens, High Molecular Weight Aliphatic amine, and 37% octadecadienyl amine. With agitation, Amines," copyrighted 1954 by Armour Chemical Division, Armour and Company." and insert instead -- amine employed in Example 12 are set forth in a publication entitled "Armeens, High Molecular Weight Aliphatic Amines," copyrighted 1954 by Armour Chemical Division, Armour and Company. --; same column 7, line 22, for "amiine" read -- amine --; column 8, line 73, for "resin" read -- resins --; column 11, in the table, the heading to the second column thereof, for "Melting point, ° C." read -- Melting point, ° C. --; column 14, line 33, for "intermedate" read -- intermediate --; lines 59 and 60, for "diphenolic acid" read -- Diphenolic Acid --; same column 14, line 74, for "reaction" read -- reacting --; column 16, lines 50, 55, 65, and 66, for "diphenolic acid", each occurrence, read -- Diphenolic Acid --; column 18, lines 25 and 26, for "substtiution" read -- substitution --; columns 21 and 22, in the table, under the heading, "Baking schedule, min./T., ° C.", for "30/175", ninth occurrence, read -- 30/150 --.

Signed and sealed this 17th day of May 1960.

(SEAL)
Attest:

KARL H. AXLINE
Attesting Officer

ROBERT C. WATSON
Commissioner of Patents